United States Patent
Davidson et al.

(10) Patent No.: US 9,971,650 B2
(45) Date of Patent: May 15, 2018

(54) PARALLEL DATA COLLECTION AND RECOVERY FOR FAILING VIRTUAL COMPUTER PROCESSING SYSTEM

(71) Applicant: INTERNATIONAL BUSINESS MACHINES CORPORATION, Armonk, NY (US)

(72) Inventors: Bryan P. Davidson, Seattle, WA (US); Michael E. Gildein, Poughkeepsie, NY (US); Angelo M. Quadara, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 148 days.

(21) Appl. No.: 15/174,129

(22) Filed: Jun. 6, 2016

(65) Prior Publication Data

US 2017/0351576 A1    Dec. 7, 2017

(51) Int. Cl.
*G06F 11/00* (2006.01)
*G06F 11/14* (2006.01)
*G06F 3/06* (2006.01)

(52) U.S. Cl.
CPC ........ *G06F 11/1415* (2013.01); *G06F 3/0617* (2013.01); *G06F 3/0632* (2013.01);
(Continued)

(58) Field of Classification Search
CPC ............. G06F 11/1415; G06F 11/1484; G06F 11/2043; G06F 11/2046; G06F 11/2048
See application file for complete search history.

(56) References Cited

U.S. PATENT DOCUMENTS 6,199,179 B1    3/2001    Kaulfman et al.
7,502,957 B2    3/2009    Helmich et al.
(Continued)

OTHER PUBLICATIONS

Authors et. al.: Disclosed Anonymously, "Hypervisor Based Method for Ensuring Consistent and Reliable Access to Shared Resource between Logical Partitions," IP.COM, IPCOM000176913D, Nov. 29, 2008, pp. 1-6.
(Continued)

*Primary Examiner* — Michael Maskulinski
(74) *Attorney, Agent, or Firm* — Cantor Colburn LLP; William A. Kinnaman, Jr.

(57) ABSTRACT

Techniques for parallel data collection and recovery for a failing virtual processing system are disclosed. According to aspects of the present disclosure, an example method includes: detecting that the virtual processing system experiences an irreparable error; saving, by each of a plurality of processors of the physical processing system, a corresponding context and data stored in an allocated portion of a memory of the physical processing system to a data store; selecting one of the plurality of processors as a recovery processor; initializing, by the recovery processor, a predetermined reserved portion of the memory; initiating, by the recovery processor, a new instance of the virtual processing system on the reserved portion of the memory while each remaining processor of the plurality of processors continues the saving; and dynamically adding each remaining processor of the plurality of processors to the new instance of the virtual processing system.

20 Claims, 7 Drawing Sheets

(52) U.S. Cl.
CPC .......... *G06F 3/0664* (2013.01); *G06F 3/0673* (2013.01); *G06F 2201/86* (2013.01)

(56) References Cited

U.S. PATENT DOCUMENTS

| | | | |
|---|---|---|---|
| 8,448,013 | B2 | 5/2013 | Clark et al. |
| 9,529,661 | B1 * | 12/2016 | Miller ................. G06F 11/3024 |
| 2005/0240806 | A1 | 10/2005 | Bruckert et al. |
| 2008/0022032 | A1 * | 1/2008 | Nicholas ............... G06F 9/4418 711/100 |
| 2014/0250335 | A1 | 9/2014 | McCoy |
| 2014/0372789 | A1 | 12/2014 | Arroyo et al. |
| 2014/0372795 | A1 | 12/2014 | Graham et al. |
| 2015/0161008 | A1 * | 6/2015 | Antony ............... G06F 11/1448 714/16 |
| 2015/0378857 | A1 * | 12/2015 | Sevigny ............. G06F 11/2094 714/6.3 |

OTHER PUBLICATIONS

Authors et. al.: Disclosed Anonymously, "Method/System to Represent Backup, Recovery, and Hierarchical Storage Management through Inventory Injection on a Hypervisor Manager," IP.COM, IPCOM000242023D, Jun. 15, 2015, pp. 1-3.

Authors et. al.: IBM, "Failover to a Redundant Controller During Dontroller," IP.COM, IPCOM000172777D, Jul. 14, 2008, pp. 1-3.

Authors et. al.: IBM, "Method to Detect and Recover from Failure During Failovers of Redundant Micro Controllers," IP.COM, IPCOM000166851D, Jan. 25, 2008, pp. 1-7.

\* cited by examiner

PARALLEL DATA COLLECTION AND RECOVERY FOR FAILING VIRTUAL COMPUTER PROCESSING SYSTEM

BACKGROUND

The present disclosure relates to computer processing systems, and more particularly to the parallel data collection and recovery of a failing virtual processing system.

Physical processing systems (or computing hosts) may utilize virtual processing systems (or computing guests) to virtualize operating systems and/or applications. Such systems typically leverage hypervisor technology to create and manage the many aspects of virtualized computing. For the purposes of this disclosure, a "virtual processing system" can refer to the entire system providing such a virtualized environment or to a single virtualized computing guest thereby supported. Any component of these systems may reach an erroneous and unrecoverable state during runtime, often necessitating a system-wide failure. At failure-time, it is important to collect the current state of the processors and memory of the physical processing system to allow for the underlying problem's subsequent analysis. It is also important to commence a recovery procedure, which may include re-initializing the physical processing system's hardware components before restarting the virtual processing system.

SUMMARY

According to examples of the present disclosure, techniques including methods, systems, and/or computer program products for parallel data collection and recovery for a failing virtual processing system are provided. An example method may include: detecting that the virtual processing system experiences an irreparable error; saving, by each of a plurality of processors of the physical processing system, a corresponding context and data stored in an allocated portion of a memory of the physical processing system to a data store; selecting one of the plurality of processors as a recovery processor; initializing, by the recovery processor, a pre-determined reserved portion of the memory; initiating, by the recovery processor, a new instance of the virtual processing system on the reserved portion of the memory while each remaining processor of the plurality of processors continues the saving; and dynamically adding each remaining processor of the plurality of processors to the new instance of the virtual processing system.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Current approaches for failure-time data collection and recovery utilize separate processes that are time-consuming and dependent on sequential execution. Data recovery may take approximately thirty to sixty minutes to complete, although other time periods for data recovery are possible. Re-initializing the virtual processing system may take another approximately sixty minutes thereafter, although this time may be shorter or longer depending on system performance and other variables. During both phases, the virtual processing system is unavailable to users, which may have a significant impact and/or cost to stakeholders in the system's reliability. Current approaches do not perform these two phases in parallel principally because the state of memory must be preserved for (and throughout) data collection.

The present techniques solve these problems by parallelizing data collection and recovery for a failing virtual processing system according to the various implementations described herein. These techniques apply to physical processing systems running virtual processing systems and to physical processing systems running a native operating system without any virtual processing systems.

In some implementations, the present techniques significantly reduce downtime by parallelizing the data collection and recovery aspects associated with recovering from a system failure. Moreover, by initializing a new instance of the virtual processing system while the system is logging its state to persistent storage, a user may experience at least partial system restoration much earlier than with previous techniques. These and other advantages will be apparent from the description that follows.

Figure 1A:
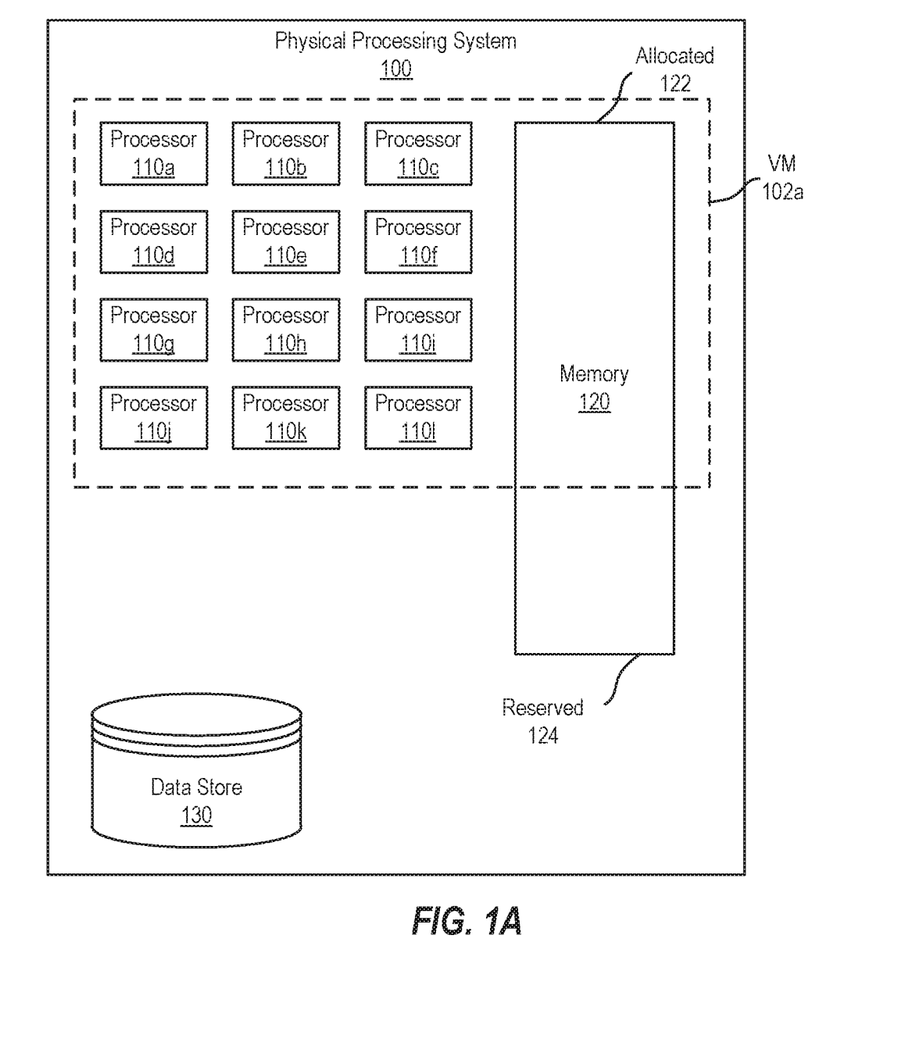
FIGS. 1A, 1B and 1C illustrate a block diagram of a physical processing system that provides the computing resources for a virtual processing system, and that executes parallel data collection and recovery according to examples of the present disclosure.
Figure 1B:
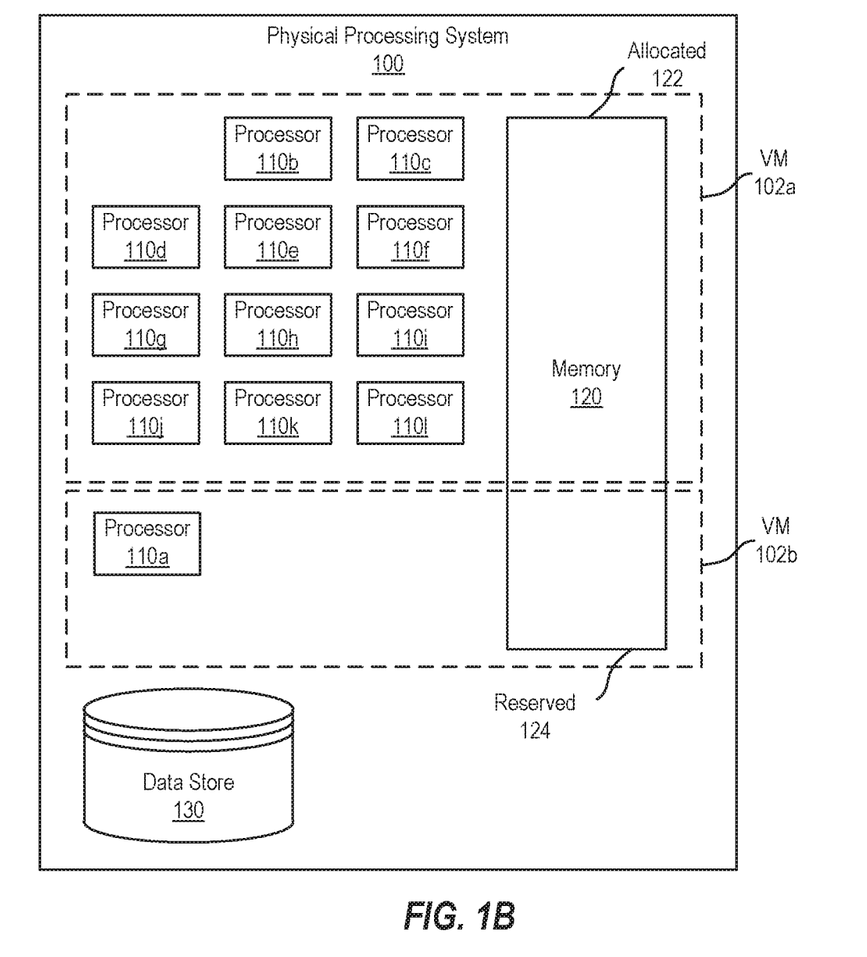
Figure 1C:
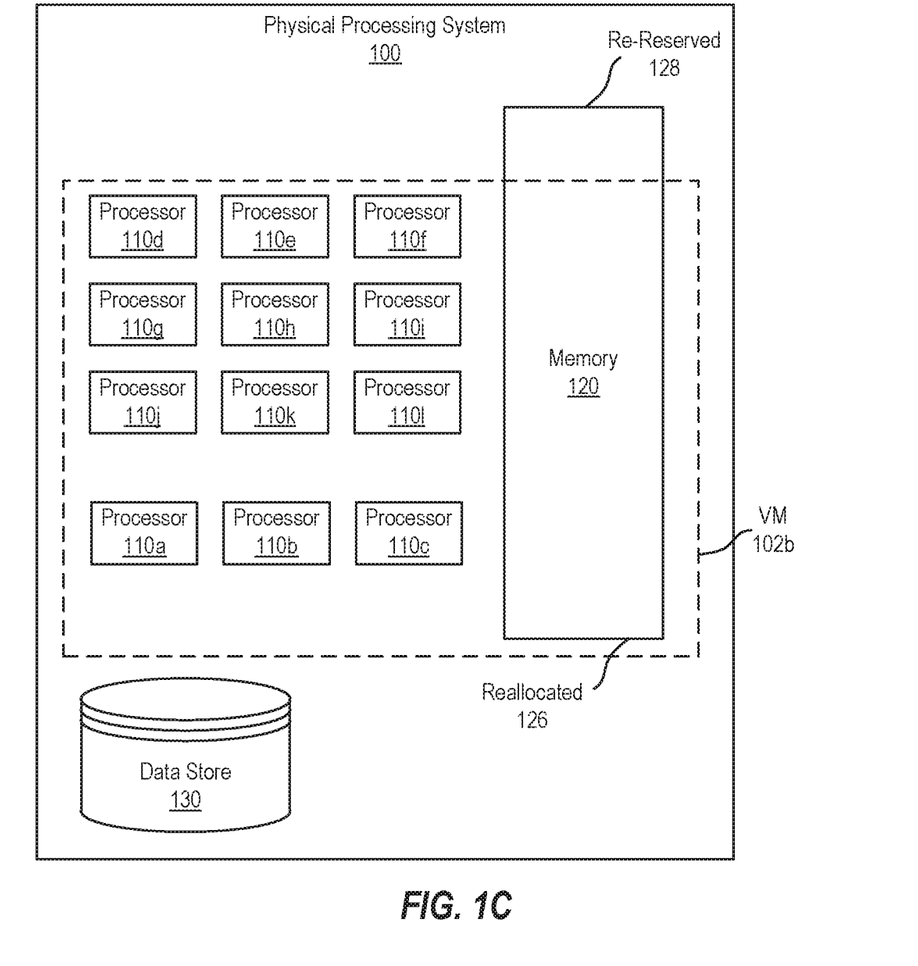

FIGS. 1A-1C illustrate a block diagram of a physical processing system 100 for demonstrating the applications of parallel data collection and recovery for a failing virtual processing system (e.g., a system with at least one virtual machine, for example, virtual machine 102a) according to examples of the present disclosure. Physical processing system 100 includes a plurality of processors 110a, 110b, 110c, 110d, 110e, 110f, 110g, 110h, 110i, 110j, 110k, 110l (referred to collectively as "processors 110"), a memory 120, and a data store 130. It should be appreciated that the data store 130 may be a persistent memory, such as non-volatile memory, flash memory, or other suitable memory for storing data. In aspects of the present disclosure, the physical processing system 100 also includes a hypervisor program (not shown), which plays a silent role in the organization of the present system hierarchy by design.

The physical processing system 100 provides computing resources for a virtual machine 102a, which utilizes the processors 110 and the memory 120. In aspects of the present disclosure, the virtual machine 102a utilizes an allocated portion 122 of the memory 120. The allocated portion 122 represents a portion of the memory 120 available to the virtual machine 102a. A reserved portion 124 of the memory is unavailable to the virtual machine 102a and is reserved for the recovery of the virtual processing system when an unrecoverable or fatal error occurs.

Upon the occurrence of a crash-inducing failure, each of the processors 110 begins storing their respective statuses into the data store 130. As illustrated in FIG. 1B, one of the processors 110 (i.e., the first processor that stores its status in the data store 130 is selected and re-purposed to initiate a new instance of the virtual processing system. The new instance of the virtual machine 102b is initiated as part of the new virtual processing system, while the remaining processors 110 (i.e., processors 110b-110l of FIG. 1B) continue to save their respective statuses to the data store 130.

Upon initiation, the new virtual processing system has one assigned processor (e.g., processor 110a) to support virtual machine 102b. The virtual machine 102b uses as its central storage the reserved portion 124 of the memory 120 originally provided during installation of the physical processing system 100.

The processor 110a handles the initialization of the virtual machine 102b until additional processors 110 finish saving their status. As each processor completes saving its status, it can be dynamically added to the virtual processing system and therefore serve as a resource to virtual machine 102b, as illustrated in FIG. 1C.

Finally, once the data collection process is complete, the virtual machine 102b begins utilizing a portion of the memory 120 previously allocated to the virtual machine 102a, and data can be reloaded to the virtual machine 102b from the data store 130. Similarly, the processors 110 can be returned to their original state (i.e., the state saved as the status upon the error occurring) or reset completely to reach a clean starting point.

Although the virtual machine 102b begins utilizing a portion of the memory 120 that was previously reserved, a new portion of the memory 120 is re-reserved (i.e., re-reserved portion 128) to be available for future data collection and recovery of a new virtual processing system.

According to examples of the present disclosure, the virtual machines 102a, 102b are managed by a hypervisor instance that could be supporting additional virtual machines. One or more of these virtual machines may have to be migrated to the previously reserved memory depending on the severity of the failure. If the hypervisor itself crashes, an entirely new virtual memory processing system may be built starting with the reserved memory and recovery processor as physical resources.

Figure 2:
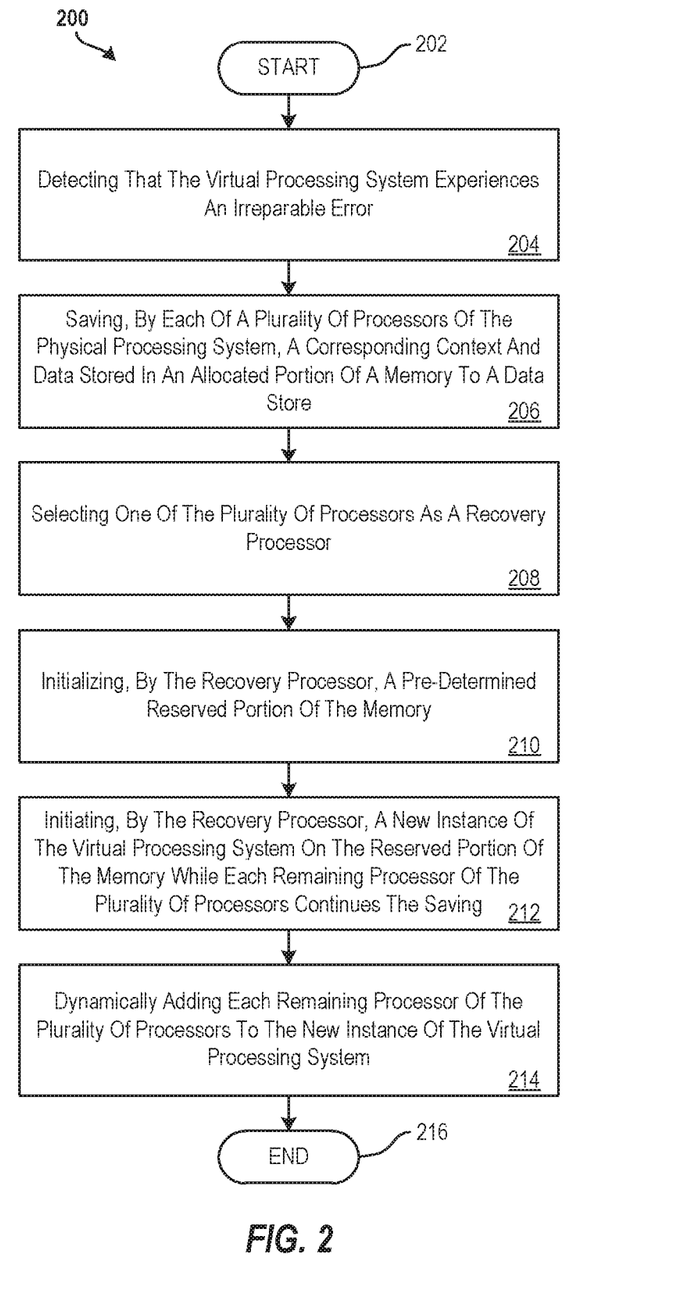
FIG. 2 illustrates a flow diagram of a computer-implemented method for parallel data collection and recovery for a failing virtual processing system according to examples of the present disclosure.

FIG. 2 illustrates a flow diagram of a method 200 for parallel data collection and recovery for a failing virtual processing system according to examples of the present disclosure. The method 200 may be performed, for example, by the physical processing system 100 of FIGS. 1A-1C and/or by the processing system 20 of FIG. 3. The method 200 begins at block 202 and continues to block 204.

At block 204, the method 200 includes detecting, by the physical processing system (e.g., physical processing system 100) or by a hypervisor, that the virtual processing system experiences an irreparable error.

At block 206, the method 200 includes saving, by each of a plurality of processors (e.g., processors 110) of the physical processing system, a corresponding context and data stored in an allocated portion (e.g., allocated portion 122) of a memory (e.g., memory 120) of the physical processing system to a data store.

At block 208, the method 200 includes selecting one of the plurality of processors (e.g., processor 110a) as a recovery processor. In some examples, such as especially time-critical cases, the recovery processor can be selected as being the first processor to complete the saving. In other cases, a particular processor can be predetermined to be the recovery processor. As another option, the recovery processor can be an additional processor not associated with the failing virtual processing system (i.e., the recovery processor is an extra processor). In this case, the recovery processor is enabled upon the detection of the irreparable error.

At block 210, the method 200 includes initializing, by the recovery processor, a pre-determined reserved portion of the memory (e.g., reserved portion 124). An alternative to reserving memory for recovery is to utilize memory as the data is saved and the memory becomes unallocated just as with the processing system. The initializing may include powering on or otherwise enabling the reserved portion of the memory.

At block 212, the method 200 includes initiating, by the recovery processor, a new instance of the virtual processing system on the reserved portion of the memory while each remaining processor of the plurality of processors continues the saving their own status and the state of memory (e.g., allocated portion 122).

At block 214, the method 200 includes dynamically adding each remaining processor of the plurality of processors to the new instance of the virtual processing system. In examples, each remaining processor (e.g., processors 110b-110l) is migrated to the new instance of the virtual processing system upon completion of the saving of the context for that processor.

The method 200 continues to block 216 and ends.

Additional processes also may be included. For example, the allocated portion of the memory becomes an unallocated portion of the memory upon completion of the saving. In such cases, the method 200 includes designating a first portion of the unallocated portion of the memory to the new instance of the virtual processing system and reserving a second portion of the unallocated portion of the memory as a new reserved portion of the memory. In some examples, the virtual processing system is a first instance of a hypervisor, and the new instance of the virtual processing system is a second instance of a hypervisor.

It should be understood that the processes depicted in FIG. 2 represent illustrations, and that other processes may be added or existing processes may be removed, modified, or rearranged without departing from the scope and spirit of the present disclosure.

Figure 3:
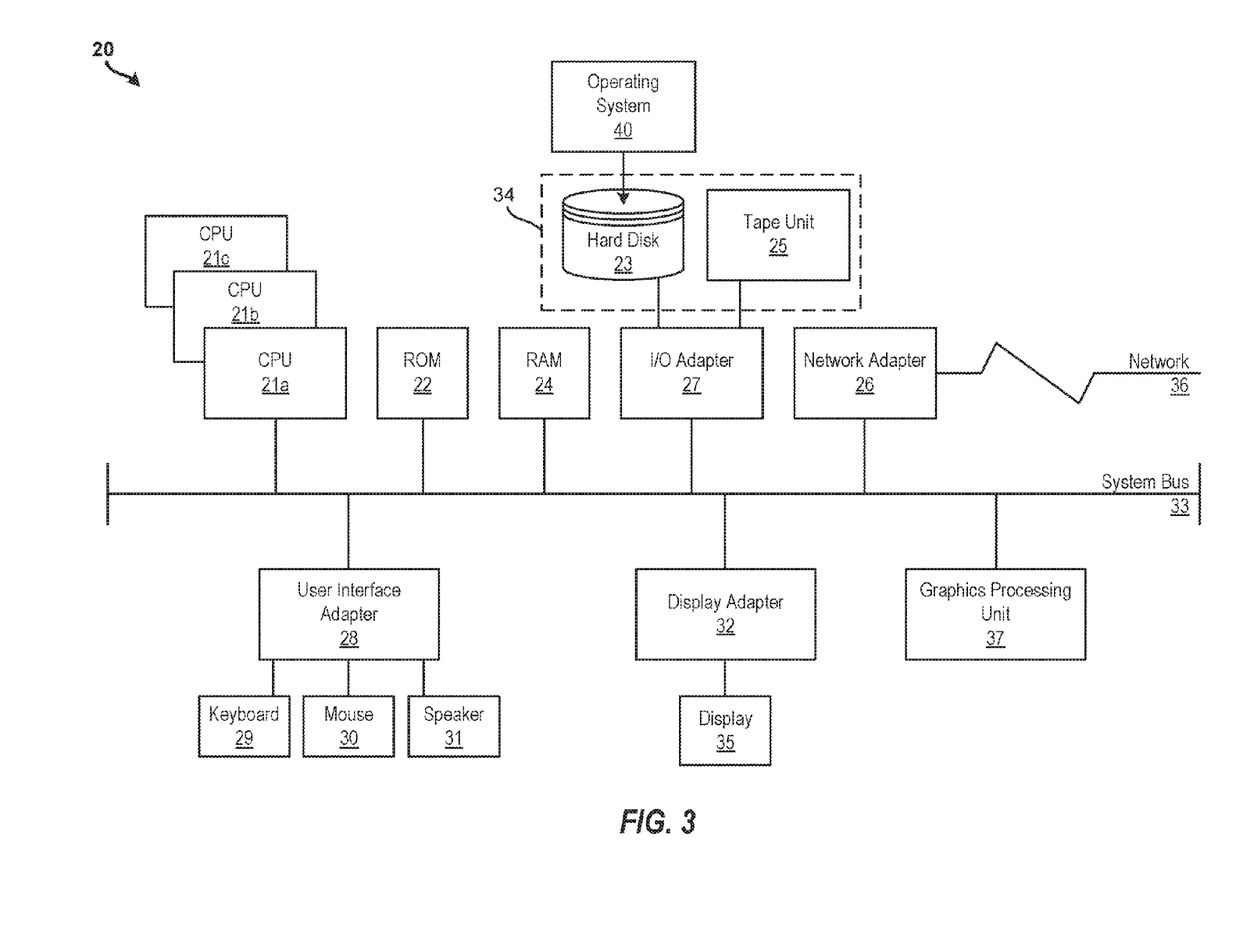
FIG. 3 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 3 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI)

adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

In other examples, the present disclosure may be implemented on cloud computing. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
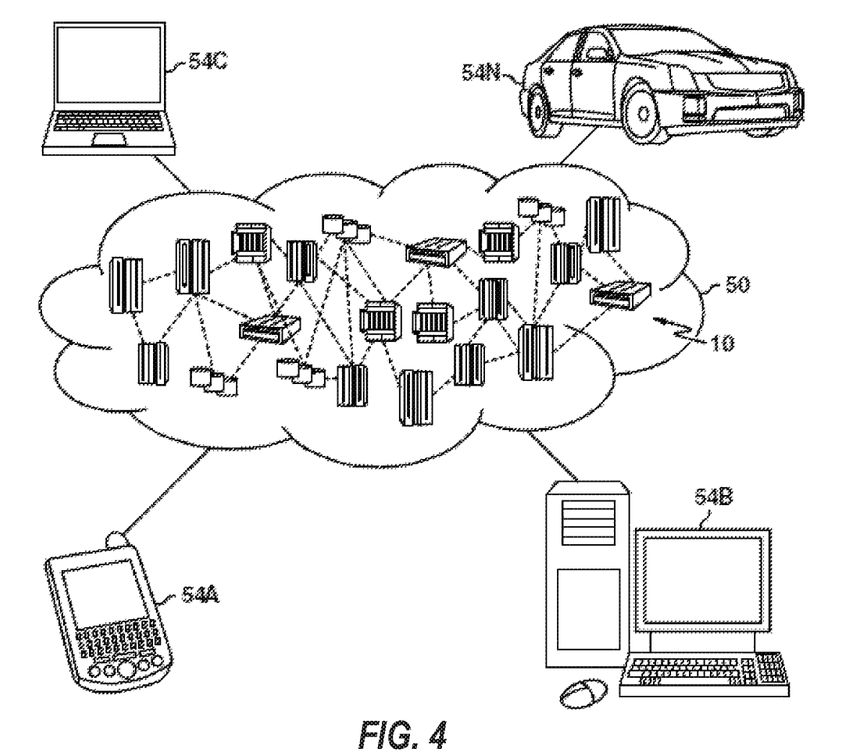
FIG. 4 illustrates a cloud computing environment according to examples of the present disclosure.

Referring now to FIG. 4, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
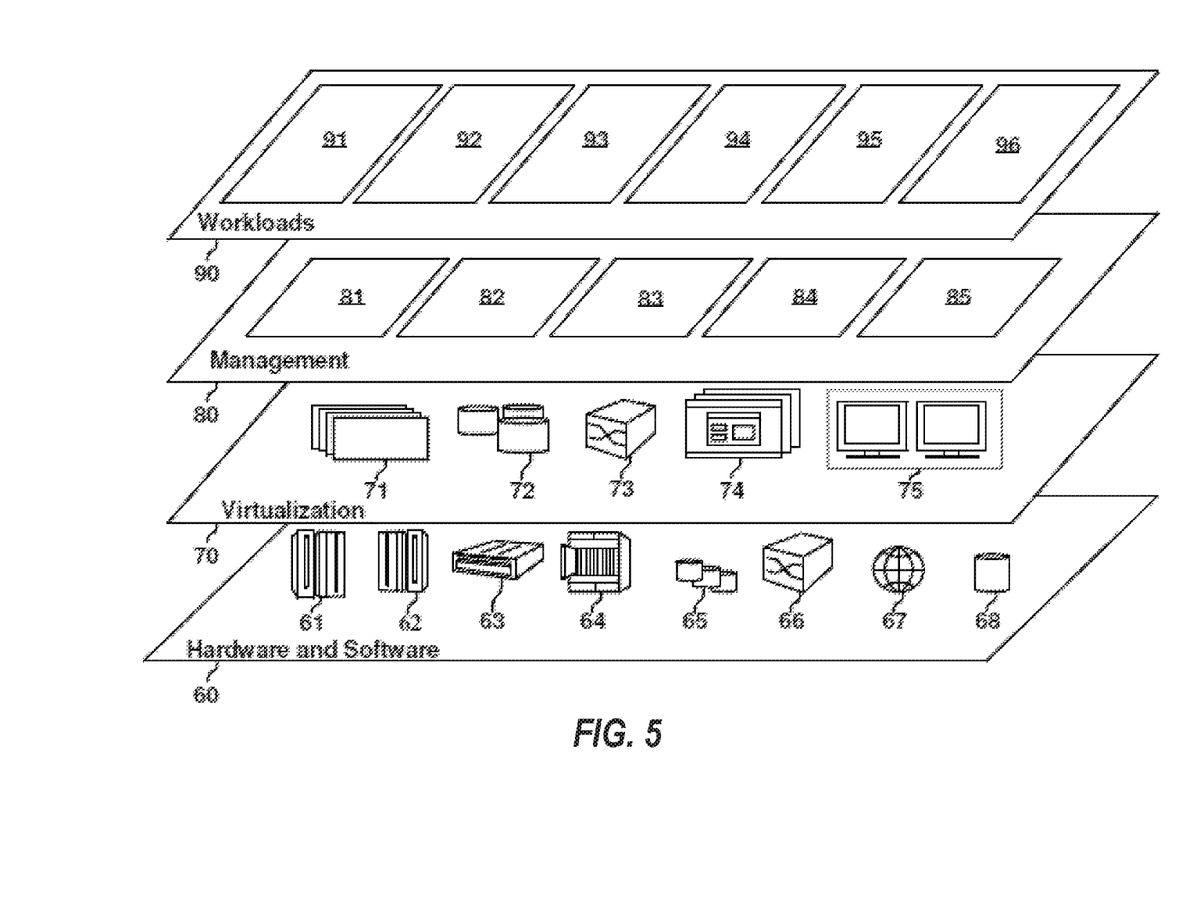
FIG. 5 illustrates abstraction model layers according to examples of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and parallel data collection and recovery for a failing virtual processing system 96.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for parallel data collection and system recovery for a failing virtual processing system executing on a physical processing system, the method comprising:
   detecting that the virtual processing system experiences an irreparable error;
   saving, by each of a plurality of processors of the physical processing system, a corresponding context and data stored in an allocated portion of a memory of the physical processing system to a data store;
   selecting one of the plurality of processors as a recovery processor;
   initializing, by the recovery processor, a pre-determined reserved portion of the memory;
   initiating, by the recovery processor, a new instance of the virtual processing system on the reserved portion of the memory while each remaining processor of the plurality of processors continues the saving; and
   dynamically adding each remaining processor of the plurality of processors to the new instance of the virtual processing system.

2. The computer-implemented method of claim 1, wherein the recovery processor is selected as being first to complete the saving.

3. The computer-implemented method of claim 1, wherein each remaining processor is dynamically added to the new instance of the virtual processing system upon completion of the saving of the context for that processor.

4. The computer-implemented method of claim 1, wherein the allocated portion of the memory becomes an unallocated portion of the memory upon completion of the saving.

5. The computer-implemented method of claim 4, further comprising:
   designating a first portion of the unallocated portion of the memory to the new instance of the virtual processing system; and
   reserving a second portion of the unallocated portion of the memory as a new reserved portion of the memory.

6. The computer-implemented method of claim 1, wherein the data store is a persistent memory.

7. The computer-implemented method of claim 1, wherein the virtual processing system is a first instance of a hypervisor, and wherein the new instance of the virtual processing system is a second instance of a hypervisor.

8. The computer-implemented method of claim 1, wherein the detecting is performed by one of a physical processing system and a hypervisor.

9. A system for parallel data collection and system recovery for a failing virtual processing system executing on a physical processing system, the system comprising:

a memory having computer readable instructions; and a processing device for executing the computer readable instructions, the computer readable instructions comprising:

detecting that the virtual processing system experiences an irreparable error;

saving, by each of a plurality of processors of the physical processing system, a corresponding context and data stored in an allocated portion of a memory of the physical processing system to a data store;

selecting one of the plurality of processors as a recovery processor;

initializing, by the recovery processor, a pre-determined reserved portion of the memory;

initiating, by the recovery processor, a new instance of the virtual processing system on the reserved portion of the memory while each remaining processor of the plurality of processors continues the saving; and     dynamically adding each remaining processor of the plurality of processors to the new instance of the virtual processing system.

10. The system of claim 9, wherein the recovery processor is selected as being first to complete the saving.

11. The system of claim 9, wherein each remaining processor is dynamically added to the new instance of the virtual processing system upon completion of the saving of the context for that processor.

12. The system of claim 9, wherein the allocated portion of the memory becomes an unallocated portion of the memory upon completion of the saving.

13. The system of claim 12, the computer readable instructions further comprising:

designating a first portion of the unallocated portion of the memory to the new instance of the virtual processing system; and     reserving a second portion of the unallocated portion of the memory as a new reserved portion of the memory.

14. The system of claim 9, wherein the data store is a persistent memory.

15. The system of claim 9, wherein the virtual processing system is a first instance of a hypervisor, and wherein the new instance of the virtual processing system is a second instance of a hypervisor.

16. The system of claim 9, wherein the detecting is performed by one of a physical processing system and a hypervisor.

17. A computer program product for parallel data collection and system recovery for a failing virtual processing system executing on a physical processing system, the computer program product comprising:

a non-transitory computer readable storage medium having program instructions embodied therewith, the program instructions executable by a processing device to cause the processing device to:

detect that the virtual processing system experiences an irreparable error;

save, by each of a plurality of processors of the physical processing system, a corresponding context and data stored in an allocated portion of a memory of the physical processing system to a data store;

select one of the plurality of processors as a recovery processor;

initialize, by the recovery processor, a pre-determined reserved portion of the memory;

initiate, by the recovery processor, a new instance of the virtual processing system on the reserved portion of the memory while each remaining processor of the plurality of processors continues the saving; and         dynamically add each remaining processor of the plurality of processors to the new instance of the virtual processing system.

18. The computer program product of claim 17, wherein the recovery processor is selected as being first to complete the saving.

19. The computer program product of claim 17, wherein each remaining processor is dynamically added to the new instance of the virtual processing system upon completion of the saving of the context for that processor.

20. The computer program product of claim 17, wherein the allocated portion of the memory becomes an unallocated portion of the memory upon completion of the saving, and wherein the processor device is further configured to:

designate a first portion of the unallocated portion of the memory to the new instance of the virtual processing system; and     reserve a second portion of the unallocated portion of the memory as a new reserved portion of the memory.

\* \* \* \* \*